(12) United States Patent
Richter

(10) Patent No.: US 9,963,271 B2
(45) Date of Patent: May 8, 2018

(54) DEVICE AND METHOD FOR DETERMINATION OF SAFE TANNING TIME

(71) Applicant: NEW MEDIC ERA AB, Stockholm (SE)

(72) Inventor: Martina Richter, Stockholm (SE)

(73) Assignee: New Medic Era AB (SE)

( * ) Notice: Subject to any disclaimer, the term of this patent is extended or adjusted under 35 U.S.C. 154(b) by 127 days.

(21) Appl. No.: 14/391,938

(22) PCT Filed: Apr. 11, 2013

(86) PCT No.: PCT/SE2013/050393
§ 371 (c)(1),
(2) Date: Oct. 10, 2014

(87) PCT Pub. No.: WO2013/154492
PCT Pub. Date: Oct. 17, 2013

(65) Prior Publication Data
US 2015/0083934 A1      Mar. 26, 2015

(30) Foreign Application Priority Data

Apr. 11, 2012   (SE) ...................................... 1250362

(51) Int. Cl.
*G01T 1/02*       (2006.01)
*B65D 25/34*      (2006.01)
(Continued)

(52) U.S. Cl.
CPC .......... *B65D 25/34* (2013.01); *B65D 41/005* (2013.01); *B65D 85/70* (2013.01); *G01J 1/429* (2013.01); *G01J 1/50* (2013.01); *G01T 1/02* (2013.01)

(58) Field of Classification Search
CPC ...................................................... G01T 1/02
(Continued)

(56) References Cited

U.S. PATENT DOCUMENTS 3,899,677 A * 8/1975 Hori ..................... C08K 5/0016
250/474.1
3,903,423 A * 9/1975 Zweig .................. A61B 5/0059
250/473.1
(Continued)

FOREIGN PATENT DOCUMENTS

DE    102010006676 A1    11/2010
EP        0333424 A2     9/1989
(Continued)

OTHER PUBLICATIONS

International Search Report dated Jun. 25, 2013 corresponding to International Patent Application No. PCT/SE2013/050393, 5 pages.
(Continued)

*Primary Examiner* — David Porta
*Assistant Examiner* — Djura Malevic
(74) *Attorney, Agent, or Firm* — Eric L. Sophir; Dentons US LLP

(57) ABSTRACT

The invention relates to a container for sunscreen agent in which the sunscreen agent has a specific predetermined sun-protection factor, comprising a sealing device (2) by which the container (1) can be closed to make its opening (8) completely sealed, the container (1) being provided with at least one sun sensor (3) arranged to indicate the current UV intensity by changing its hue depending on the UV intensity of the radiation striking the sensor (3), said container further comprising a color-reference range (4) for comparative reading of the hue of the sensor to enable the determination of UV intensity, and time indicator (50) for determining the period of time during which a person of a specific skin type can expose his or her skin to solar radiation at said determined UV intensity without sunburn arising, provided said person has applied the sunscreen agent from the container to the skin, said sun sensor (3) being arranged as an integral part of the container (1) and being positioned such that it is (Continued)

completely covered by the sealing device (2) when the sealing device (2) is sealed.

9 Claims, 2 Drawing Sheets

(51) Int. Cl.
  *G01J 1/50* (2006.01)
  *G01J 1/42* (2006.01)
  *B65D 41/00* (2006.01)
  *B65D 85/00* (2006.01)

(58) Field of Classification Search
  USPC .................. 250/473.1, 474.1; 206/459.1
  See application file for complete search history.

(56) References Cited

U.S. PATENT DOCUMENTS

| | | | | |
|---|---|---|---|---|
| 4,198,861 A * | 4/1980 | Mung-Kuen Luk | G01K 11/165 | 374/162 |
| 4,271,984 A * | 6/1981 | Ducros | B65D 35/242 | 222/144.5 |
| 4,408,557 A * | 10/1983 | Bradley | G01K 3/04 | 116/206 |
| 4,762,124 A * | 8/1988 | Kerch | A61K 8/0208 | 174/16.3 |
| 4,818,491 A * | 4/1989 | Fariss | G01J 1/58 | 116/207 |
| 4,863,282 A * | 9/1989 | Rickson | G01J 1/50 | 250/372 |
| 4,919,983 A * | 4/1990 | Fremin | A61J 9/02 | 215/11.2 |
| 4,952,498 A * | 8/1990 | Waters | C12M 23/08 | 116/270 |
| 5,036,311 A * | 7/1991 | Moran | G01J 1/429 | 250/372 |
| 5,117,116 A * | 5/1992 | Bannard | A61B 5/444 | 250/472.1 |
| 5,190,175 A * | 3/1993 | Schmidt | B65D 55/026 | 116/207 |
| 5,365,068 A * | 11/1994 | Dickerson | A61N 5/06 | 250/372 |
| 5,387,798 A * | 2/1995 | Funakoshi | C09K 9/02 | 250/474.1 |
| 5,391,883 A * | 2/1995 | Kinsey | G01J 1/04 | 250/372 |
| D376,547 S * | 12/1996 | McRae | D10/78 | |
| 5,581,090 A * | 12/1996 | Goudjil | G01J 1/50 | 250/372 |
| 5,589,398 A * | 12/1996 | Krause | G01J 1/50 | 422/423 |
| 5,612,542 A * | 3/1997 | Brown | G01J 1/50 | 250/474.1 |
| 5,686,727 A * | 11/1997 | Reenstra | G01J 1/429 | 250/227.11 |
| 5,720,555 A * | 2/1998 | Elele | G01K 11/16 | 116/216 |
| 5,802,015 A * | 9/1998 | Rothschild | G04F 1/005 | 116/202 |
| 5,986,273 A * | 11/1999 | Tripp | G01J 1/50 | 250/474.1 |
| 6,046,455 A * | 4/2000 | Ribi | G01J 1/50 | 250/336.1 |
| 6,085,942 A * | 7/2000 | Redmond | B29C 51/08 | 206/469 |
| 6,086,858 A * | 7/2000 | McEleney | A61K 8/4973 | 424/401 |
| 6,348,694 B1 * | 2/2002 | Gershteyn | A61B 5/0059 | 250/372 |
| 6,378,906 B1 * | 4/2002 | Pennaz | C09D 11/50 | 106/31.32 |
| 6,405,867 B1 * | 6/2002 | Moore | B65D 1/0207 | 206/459.1 |
| 6,437,346 B1 * | 8/2002 | Goudjil | G01J 1/50 | 250/372 |
| 6,555,028 B2 * | 4/2003 | Walters | C07D 311/92 | 252/586 |
| 6,698,590 B2 * | 3/2004 | Moore | B65D 1/0207 | 206/459.1 |
| 6,726,013 B2 * | 4/2004 | Pennaz | C09D 11/50 | 206/459.1 |
| 6,734,440 B2 * | 5/2004 | Questel | G01J 1/50 | 250/474.1 |
| 6,817,192 B2 * | 11/2004 | Ector, Jr. | G01N 33/02 | 206/459.1 |
| 6,929,136 B2 * | 8/2005 | Salazar-Leal | B65D 51/245 | 116/207 |
| 6,936,824 B2 * | 8/2005 | Takada | A61B 5/0059 | 250/372 |
| 7,227,153 B2 * | 6/2007 | Yagi | G01J 1/429 | 250/372 |
| 7,247,140 B2 * | 7/2007 | Ophardt | G07F 9/02 | 250/372 |
| 7,265,358 B2 * | 9/2007 | Fontaine | A42B 1/062 | 250/330 |
| 7,500,746 B1 * | 3/2009 | Howell | G02C 11/00 | 351/158 |
| 7,509,839 B2 * | 3/2009 | Duranton | A45D 33/26 | 206/581 |
| 7,907,477 B2 * | 3/2011 | Puzia | A61J 7/0472 | 215/230 |
| 8,897,100 B2 * | 11/2014 | Joo | G04F 3/06 | 368/109 |
| 2002/0022008 A1 * | 2/2002 | Forest | A61K 8/19 | 424/59 |
| 2003/0056410 A1 * | 3/2003 | Witkowski | G09F 3/0288 | 40/310 |
| 2003/0226978 A1 * | 12/2003 | Ribi | A61K 8/02 | 250/474.1 |
| 2004/0031927 A1 * | 2/2004 | Tsai | A61B 5/441 | 250/372 |
| 2004/0155199 A1 * | 8/2004 | Su | G01J 1/429 | 250/372 |
| 2005/0145525 A1 * | 7/2005 | Williams | B65D 43/02 | 206/459.1 |
| 2005/0255050 A1 * | 11/2005 | Trunk | A61K 31/538 | 424/46 |
| 2005/0285050 A1 * | 12/2005 | Bruce | G01J 1/50 | 250/474.1 |
| 2006/0067896 A1 * | 3/2006 | Schaffer | A61K 8/35 | 424/59 |
| 2008/0000992 A1 * | 1/2008 | Mediare | G01K 11/12 | 235/494 |
| 2008/0121816 A1 * | 5/2008 | Ellig | G01J 1/429 | 250/474.1 |
| 2008/0265170 A1 * | 10/2008 | Ales | A61B 5/0059 | 250/372 |
| 2009/0147215 A1 * | 6/2009 | Howell | G02C 11/00 | 351/158 |
| 2009/0284732 A1 * | 11/2009 | Vitale | B65D 23/16 | 356/51 |
| 2010/0163749 A1 * | 7/2010 | Hunwick, III | G01K 11/12 | 250/474.1 |
| 2012/0153179 A1 * | 6/2012 | Tew | B05B 11/3042 | 250/372 |
| 2012/0168333 A1 * | 7/2012 | Mackay | A45D 34/00 | 206/459.1 |

FOREIGN PATENT DOCUMENTS

| | | |
|---|---|---|
| WO | 99/05038 A2 | 2/1999 |
| WO | 9905038 A2 | 2/1999 |
| WO | 2010/139978 A2 | 12/2010 |
| WO | 2010139978 A2 | 12/2010 |

OTHER PUBLICATIONS

(56) References Cited

OTHER PUBLICATIONS

Extended European Search Report dated Mar. 26, 2015 corresponding to European Patent Application No. 13775308.3, 5 pages.
Patent Exam Report dated Sep. 16, 2015 corresponding to Australian Patent Application No. 2013247416, 3 pages.
European Communication dated Mar. 4, 2016 in European Application No. 13 775 308.3-1562, 4 pages.
Patent Examination Report No. 2 dated Jan. 18, 2016 corresponding to Australian Patent Application No. 2013247416, 4 pages.
Professor Hans Christian Wulf, Bispebjerg Hospital, Copenhagen University, Copenhagen, Denmark; "Test Report of UV-sensor, Sweden patent SE 536 450 C2, SkinPlan®"; undated test report commissioned by New Medic Era AB, tockholm, Sweden; obtained from New Medic Era AB in Jul. 2017; 19 pages.

* cited by examiner

DEVICE AND METHOD FOR DETERMINATION OF SAFE TANNING TIME

CROSS-REFERENCE TO RELATED APPLICATIONS

This application claims priority to PCT/EP2013/050393, filed Apr. 11, 2013, which claims priority to Swedish Patent Application No. 1250362-9, filed Apr. 11, 2012, all of which are incorporated by reference in their entirety.

FIELD OF THE INVENTION

The invention relates to a container for sunscreen agent in which the sunscreen agent has a predetermined sun-protection factor, comprising a sealing device by which the container can be closed to make its orifice completely sealed, the container being provided with at least one sun sensor arranged to indicate the current UV intensity by changing its hue depending on the UV intensity of the radiation striking the sensor.

TECHNICAL BACKGROUND

It is previously known to use sun sensors comprising a photochromic ink to measure the UV intensity. For instance, US2005285050 discloses a container for sunscreen agent comprising a sun detector designed to indicate when the cumulative UV radiation to which the bottle (detector) has been exposed reaches a threshold value. Further, sun detectors of a similar nature have previously been used on "sun cards" and on bracelets for the user/wearer to determine the strength of solar radiation.

There is a widespread and ever-increasing need for protection against UV radiation due to the risk of cancer, while many people still desire to spend time in the sun because it is pleasant or in order to tan (i.e., for beauty reasons). Being able to tan safely is therefore desirable, and there is a need for new and improved products for the purpose.

OBJECT OF THE INVENTION

It is an object of the invention to provide an improved product for the determination of safe tanning time under current circumstances, depending on the user's skin type.

BRIEF DESCRIPTION OF THE INVENTION

The object of the invention is accomplished by a product according to claim 1.

According to one aspect of the invention, the invention comprises a container/bottle for sunscreen agent, where the sunscreen agent has a specific sun-protection factor, provided with a sealing device/cap by which the container can be sealed such that its orifice becomes completely blocked. The container is provided with at least one sun sensor arranged to indicate the current UV intensity by changing its hue depending on the UV intensity of the radiation striking the sensor. The container further comprises a colour-reference range for comparative reading of the sensor hue to enable the determination of UV intensity. Further, the container is provided with a skin-type indicator for determining the skin type of a specific user, and a time indicator for determining the period of time during which a person of a specific skin type can expose his or her skin to solar radiation at said determined UV intensity without suffering from sunburn. Sunburn occurs before the skin is visibly burnt. The combination of sun sensor and time-table, along with information on the skin type and the sun-protection factor of the lotion, results in the unique product and protection. Thanks to the product according to the invention, a user can easily and quickly determine for how long it is safe to stay in the sun without getting sunburn—herein referred to as "safe tanning time." The container preferably contains sunscreen agent having a specific, predetermined factor. Said sun sensor is arranged as an integral part of the container and is positioned such that it is completely covered by the sealing device when the sealing device is sealed.

The invention enables the use of a UV-sensitive, photochromic indicator (also called "sun sensor") to determine the solar intensity, which, together with information on skin type makes it possible to determine the time during which a user can stay in the sun without suffering from sunburn. In a preferred embodiment, the product is adapted to determine said safe tanning time if the person in question applies a sun-protection product with a specific factor to the skin. Thanks to the design of the product, the photochromic indicator will be protected from UV radiation when not in use, which protects it from unnecessary wear and significantly extends product life. If the sensor is continually exposed to UV light, its performance will quickly diminish, making it unreliable for its purpose. Thanks to the invention, however, the sensor itself will not to be a limitation to the expiry of the product, which may contribute to, for instance, potentially extended shelf life both of containers that have not yet been filled with sunscreen agent, and of containers containing sunscreen agent. Thereby, the product according to the invention contributes to potentially simplified logistics and prevents unnecessary disposal of containers (due to worn-out sensor), as compared to existing products.

According to one aspect of the invention, the sun sensor is located at the top portion of the container at such a position that it is fully protected by the cap when the latter is in place. The design and position of the sensor results in maximised exposure of the sensor to sunlight when the cap is removed, the sensor also being located at such a distance from the orifice of the bottle that it does not risk being smeared with sun lotion (or other sunscreen agent, such as spray). Once the cap is removed from the bottle top, the sensor will be exposed to sunlight and its position contributes to the very quick reaction of the photochromic ink to the current UV intensity, the ink switching to the corresponding hue.

In another aspect of the invention, the container comprises an orifice at its top portion, through which the sunscreen product (e.g., the sun lotion), contained in the container is intended to be dispensed. The sun sensor is preferably located at a specific distance from the orifice to minimise the risk of the sun-protection product falling on the sensor and blocking it. The container cap hereby acts as tight seal of the orifice and as a protection of the sensor, preventing it from unnecessary wear by UV light.

BRIEF DESCRIPTION OF THE DRAWINGS

The invention will now be more closely described using embodiments referring to appended drawings, in which.

DETAILED DESCRIPTION OF THE DRAWINGS

FIGS. 1-4 shows the invention according to a preferred embodiment.

Figure 1:
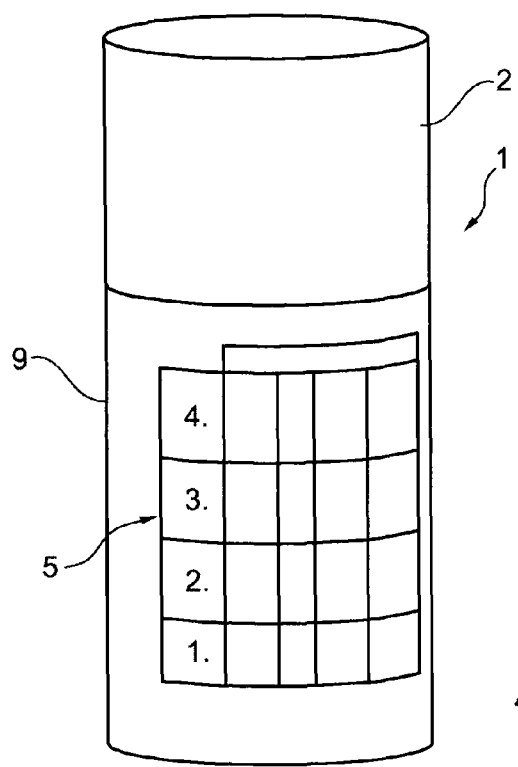
FIG. 1 shows an example of a container according to the invention.
Figure 2:
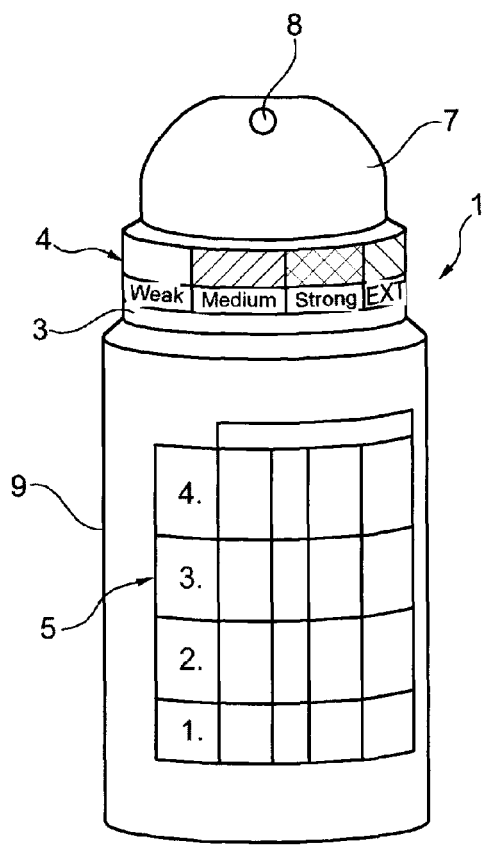
FIG. 2 shows the container of FIG. 1 without the cap.

In FIGS. 1-2 the container has the general designation of 1. The container 1 is intended to contain sunscreen agent which has a specific sun-protection factor, and comprises a sealing device 2 (container cap) by which the container 1 can be closed to make its opening/orifice 8 completely and tightly sealed. The container 1 is provided with at least one sun sensor 3 arranged to indicate the current UV intensity by changing its hue depending on the UV intensity of the radiation striking the sensor 3. Said sun sensor 3 is arranged as an integral part of the container 1 and is positioned such that it is completely covered by the sealing device 2 when the sealing device 2 is sealed, i.e., when the cap is in place as shown in FIG. 1.

Figures 3, 4:
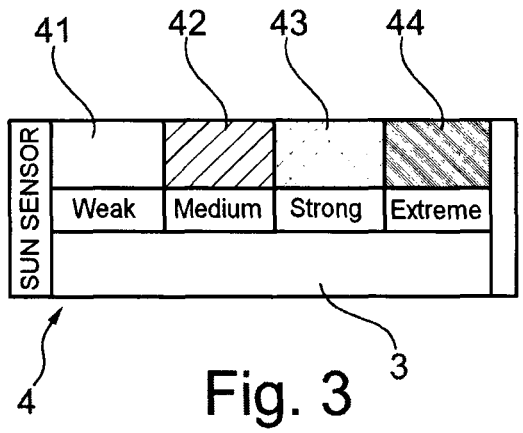
FIG. 3 shows a detailed view of reference ranges according to the invention.
FIG. 4 shows a detailed view of a sun matrix according to the invention.

The container 1 further comprises a colour-reference range 4 for comparative reading of the hue of the sensor 3 to enable the determination of UV intensity. Preferably, the reference range 4 is positioned in close proximity to the sensor 3, such that the hue of the sensor can be easily compared to the colour scale of the reference range. In one embodiment, the sensor 3 is in the form of an elongate strip located next to the reference range 4, preferably along the entire length of the reference range as seen in FIG. 2 and FIG. 3. Thus, when the sensor strip 3 reacts to sunlight, the entire sensor strip 3 will change its hue, making it very easy to determine which of the reference colours in the range 4 is closest to the colour of the sensor strip, which facilitates accurate determination of the UV intensity. In a preferred embodiment, the reference range 4 is located at the upper top portion 7 of the container, under the cap 2, to stay protected from dirt when the product is not in use.

The reference range 4 will be described in more detail in connection with FIG. 3.

It is contemplated that the sensor 3 can be designed in other ways than as a strip, and also that it can be positioned in another way than described above. According to an aspect of the invention (not shown), the sun sensor 3 is positioned further up on the top portion 7 of the container 1, in an section which, when the bottle is positioned vertically upright on a horizontal flat surface, is at a substantially upward angle. Such a container design, along with the position of the sensor 3, causes the bottle 1 to, when in use, maximise the exposure of the sensor to sunlight, as the sensor is then turned upwards corresponding to the upward direction of the sky when outdoors. Once the cap 2 is removed from the bottle, the sensor 3 will be exposed to sunlight, and its position at the top portion of the container 1 contributes to the photochromic ink reacting rapidly to the current UV intensity and switching to the corresponding hue.

Further, the container 1 is provided with a sun matrix 5 comprising a time indicator 50 for determining the period of time during which a person of a specific skin type can expose his or her skin to solar radiation at said determined UV intensity without suffering from sunburn. Herein, this time period is also referred to as "safe tanning time." The time indicator is preferably calibrated according to the protection factor of the sunscreen agent contained in the bottle, which means that the safe tanning time is correct provided that said person has applied sunscreen agent from the container 1 to his or her skin. The sun matrix 5 is positioned to be easily read, preferably on the body 9 of the bottle.

FIG. 3 shows an example of a possible reference range 4 according to the invention. According to a preferred embodiment, the reference range is 4 positioned next to a sensor 3 in the form of a strip extending along the reference range. In the shown example, different hues of the reference 4 are displayed as a range where paler colours 41 indicate weak UV radiation and darker colours 44 indicate increasing UV intensity.

In the example shown, the range comprises four levels of UV intensity with the corresponding hue: weak 41, medium 42, strong 43 and extreme 44.

FIG. 4 shows an example of a possible configuration of a sun matrix 5 according to the invention. The sun matrix is provided with a skin-type indicator where four different skin types can be observed. The indicated skin types can correspond to, for instance, different so-called Fitzpatrick skin types, ranging from very pale (type 1) to dark skin (type 6). In the embodiment, the first four Fitzpatrick skin types, 1-4, are included, but the darker skin types could naturally be included, or the sun matrix could be fine-tuned if justified, and, for instance, depending on the product's market and prospective buyers.

The most sensitive skin type, skin type 1, numbered 51, is characterised by noticeably fair skin, ruddy hair, blue eyes, always burns and rarely tans.

Skin type 2, classified as the second most sensitive and numbered 52, is characterised by fair complexion, blonde to light brown hair, blue to gray or green eyes, usually tans and sometimes burns.

Less sensitive is skin type 3, numbered 53 in the table, usually having normal complexion, dark blonde to brown hair, gray to brown eyes, always tans and rarely burns.

Finally, skin type 4, being the least sensitive, here numbered 54, is characterised by light brown to olive-coloured skin, dark hair and dark eyes, always tans and never burns.

Along with the matrix 5 there is a table/time indicator 50 showing for how long the user can tan depending on his or her skin type, and whether or not the user is accustomed to sun without sunburn occurring.

The sun matrix 5 further comprises a time indicator 50 for reading the safe tanning time. Information on skin type and current UV intensity enables reading, in the time indicator, a time interval corresponding to the time period during which the person can stay in the sun without getting sunburn, provided sunscreen agent from the container has been applied to the skin. According to one embodiment, the time indicator 50 comprises, for each skin type, information on safe tanning time depending on whether the person is accustomed to sun 55 or unaccustomed to sun 56.

The use of the product according to the invention will now be described with reference to FIGS. 1-4.

The container cap 2 is removed from the bottle 1, and the user applies the product to the skin portion that will be exposed to sunlight. The container is positioned such that the uncovered sun sensor 3 is exposed to light (e.g., standing on the ground), if weather permits in such a way that the sensor 3 lands in/faces the sun. Depending on the current UV intensity, the hue of the sensor 3 will change. Once the sensor 3 exhibits a stable hue (i.e., one that does not noticeably change colour), the hue of the sensor 3 is compared to the colours of the reference range 4 at the top of the bottle. This provides information on the current UV intensity. The user can determine his or her own skin type by comparing it to the skin-type indicator on the side/body 9 of the bottle. Information on skin type and current UV intensity is then used to ascertain the safe tanning time in the time indicator 50 of the sun matrix 5, which is visibly located on the side/body 9 of the container 1.

Example 1

Lisa has red hair and very sensitive and fair skin. According to the skin-type indicator, Lisa is of skin type 1. After having applied sunscreen agent, Lisa puts the bottle with the sensor 3 facing the sun. The sensor 3 indicates that the sun is currently strong 43. This day, Lisa is not accustomed to sun. It is early spring in Sweden, but the sun is strong. The sun matrix 5 shows that Lisa can stay for 45 minutes in the sun under current circumstances without risking sunburn.

Naturally, the invention is not in any way limited to the preferred embodiments described above, but many potential modifications thereof should be apparent to those skilled in the art without departing from the scope and spirit of the invention as defined by the appended claims. For instance, the bottle in the drawings is shown as an elongated cylindrical body, but those skilled in the art understand that the container shape can be varied in countless ways, as long as the bottle top portion can be adapted such that the container cap protects the sensor while also sealing the orifice of the bottle, the sensor fitting in its position at such a distance from the orifice 8 that the bottle contents do not risk falling on the sensor 3, thereby impairing its performance.

The invention claimed is:

1. A container for sunscreen agent in which the sunscreen agent has a predetermined sun-protection factor, comprising:
a sealing device configured to close the container and completely seal an orifice of the container;
at least one sun sensor comprising a layer of photochromic ink, wherein the sun sensor is an integral part of the container and is positioned to be completely covered by the sealing device when the sealing device closes the container and completely seals the orifice of the container, wherein the sealing device is configured to be removed from the container such that the layer of photochromic ink of the sun sensor is uncovered, and the sun sensor is configured to indicate a current UV intensity by changing its hue depending on UV intensity of radiation striking the at least one sun sensor when the sealing device is removed from the container;
a color-reference range configured for comparative reading of the hue of the sensor to enable a determination of UV intensity, wherein the color-reference range is positioned such that it is completely covered by the sealing device when the sealing device closes the container and completely seals the orifice of the container; and
a time indicator configured for determining a period of time during which a person of a specific skin type can expose his or her skin to solar radiation at the determined UV intensity without sunburn arising, provided the person has applied the sunscreen agent from the container to the skin.

2. The container according to claim 1, wherein the sensor is an elongate strip extending parallel to the color-reference range.

3. The container according to claim 1, wherein the sensor is positioned at a top portion of the container such that it, when the container stands upright on a horizontal flat surface, is oriented substantially in an upward direction.

4. A method for determining safe tanning time, the method comprising:
providing a container according to claim 1;
removing the sealing device such that the sun sensor is uncovered;
exposing the sun sensor to UV radiation such that the sun sensor changes its hue;
comparing the hue of the sun sensor to the color-reference range to determine current UV intensity;
determining a skin type using a skin-type table; and
determining a safe tanning time by reading a sun matrix including the time indicator, based upon the current UV intensity and the skin type.

5. The container according to claim 1, further comprising a sun matrix comprising the time indicator, a plurality of values of the specific skin type, and a plurality of values of the current UV intensity; wherein the time indicator includes a plurality of time intervals each corresponding to a period of time during which a person of a specific skin type can expose his or her skin to solar radiation at a specific UV intensity without sunburn arising, wherein each of the plurality of time intervals corresponds to one of the plurality of values of the specific skin type and one of the plurality of values of the current UV intensity.

6. The method according to claim 4, wherein the sun matrix comprises a plurality of values of the specific skin type and a plurality of values of the current UV intensity, and wherein the time indicator includes a plurality of time intervals each corresponding to a period of time during which a person of a specific skin type can expose his or her skin to solar radiation at a specific UV intensity without sunburn arising, wherein each of the plurality of time intervals corresponds to one of the plurality of values of the specific skin type and one of the plurality of values of the current UV intensity.

7. The container according to claim 1, wherein the container is a bottle, and wherein the sealing device is a cap that tightly seals a top portion of the bottle.

8. The container according to claim 7, wherein the at least one sun sensor is positioned at the top portion of the bottle such that it, when the bottle stands upright on a horizontal flat surface, is oriented substantially in an upward direction.

9. A container for sunscreen agent in which the sunscreen agent has a predetermined sun-protection factor, comprising:
a sealing device configured to close the container and completely seal an orifice of the container, and configured to be removed from the container;
at least one sun sensor configured as an integral part of the container and positioned to be completely covered by the sealing device when the sealing device closes the container and completely seals the orifice of the container, wherein the at least one sun sensor comprises a photochromic indicator configured, when the sealing device is removed from the container such that the sun sensor is uncovered, to indicate a current UV intensity of radiation striking the at least one sun sensor by reacting to exposure to the radiation to switch to a hue corresponding to the current UV intensity;
a color-reference range configured for comparative reading of the hue of the sun sensor to enable a determination of UV intensity; and
a time indicator configured for determining a period of time during which a person of a specific skin type can expose his or her skin to solar radiation at the determined UV intensity without sunburn arising, provided the person has applied the sunscreen agent from the container to the skin.

* * * * *